United States Patent
Brunet et al.

(10) Patent No.: US 10,223,699 B2
(45) Date of Patent: Mar. 5, 2019

(54) SYSTEM AND METHOD OF RULE CREATION BASED ON FREQUENCY OF QUESTION

(71) Applicant: CrowdCare Corporation, Richmond Hill (CA)

(72) Inventors: Jeffrey Brunet, Aurora (CA); Yousuf Chowdhary, Maple (CA); Ian Collins, Markham (CA); Artiom Kreimer, Aurora (CA); Karen Chan, Richmond Hill (CA)

(73) Assignee: CrowdCare Corporation, Richmond Hill, Ontario (CA)

( * ) Notice: Subject to any disclaimer, the term of this patent is extended or adjusted under 35 U.S.C. 154(b) by 665 days.

(21) Appl. No.: 14/818,477

(22) Filed: Aug. 5, 2015

(65) Prior Publication Data
US 2016/0042273 A1   Feb. 11, 2016

Related U.S. Application Data

(60) Provisional application No. 61/999,735, filed on Aug. 5, 2014.

(51) Int. Cl.
*G06Q 30/00*   (2012.01)
*G06N 5/02*    (2006.01)

(52) U.S. Cl.
CPC ........... *G06Q 30/016* (2013.01); *G06N 5/025* (2013.01)

(58) Field of Classification Search
CPC .................................................. G06Q 30/016
See application file for complete search history.

(56) References Cited

U.S. PATENT DOCUMENTS

| | | | |
|---|---|---|---|
| 7,343,604 B2 * | 3/2008 | Grabarnik | G06F 8/427 709/223 |
| 7,401,320 B2 | 7/2008 | Brunet | |
| 7,643,829 B2 | 1/2010 | Hiyama | |
| 7,818,274 B1 * | 10/2010 | Ottamalika | H04L 41/0681 706/45 |
| 8,099,311 B2 | 1/2012 | LaVecchia | |
| 9,529,579 B2 * | 12/2016 | Brunet | G06F 8/65 |

(Continued)

OTHER PUBLICATIONS

Kolomiyets, Oleksandr et al.; A survey on question answering technology from an information retrieval perspective; Elsevier; Information Sciences 181 (2011) 5412-5434. (Year: 2011).*

*Primary Examiner* — Stanley K. Hill
(74) *Attorney, Agent, or Firm* — White and Williams LLP

(57) ABSTRACT

A method is provided for prioritizing rule creation for computer-assisted customer care. When a question from a user of a device is received by a customer care analytics engine for which no rule is automatically fired, the question and a related device profile of the device are added to an unfired questions list. The analytics engine parses the question to match terms in other questions in the list. The question is also added to an appropriate category in the list based on the device profile. A prioritization algorithm is used to rank the question among other questions within the list or the category, ranking the question more highly according to the frequency of those terms in the category or the list. According to its rank-wise order, the question is directed for creation of a rule to permit automatic handling of questions having the same or similar terms in the future.

17 Claims, 7 Drawing Sheets

(56) References Cited

U.S. PATENT DOCUMENTS

2006/0143058 A1\* 6/2006 Brunet ................ H04M 3/5233
  717/101
2014/0156539 A1   6/2014 Brunet
2014/0313904 A1  10/2014 Brunet \* cited by examiner Q1: My phone has always worked suddenly my calls are being dropped????

Q2: I cant sync my personnal data since the ltest OS update

Q3: My downloads are randumly crashing. :-(

Q4: Wen im listening to music my service suddenly stops. This has happend alot resently.

etc.

| Verbs | crash | drop | stop | sync | etc. |
|---|---|---|---|---|---|
| Q1 |  | 1 |  |  |  |
| Q2 |  |  |  | 1 |  |
| Q3 | 1 |  |  |  |  |
| Q4 |  |  | 1 |  |  |
| [...] |  |  |  |  |  |
| Qn |  |  |  |  |  |

| Nouns | call | data | download | music | service | update | etc. |
|---|---|---|---|---|---|---|---|
| Q1 | 1 |  |  |  |  |  |  |
| Q2 |  | 1 |  |  |  | 1 |  |
| Q3 |  |  | 1 |  |  |  |  |
| Q4 |  |  |  | 1 | 1 |  |  |
| [...] |  |  |  |  |  |  |  |
| Qn |  |  |  |  |  |  |  |

| Adverbs | randomli | suddenli | etc. |
|---|---|---|---|
| Q1 |  | 1 |  |
| Q2 |  |  |  |
| Q3 | 1 |  |  |
| Q4 |  | 1 |  |
| [...] |  |  |  |
| Qn |  |  |  |

FIG. 7

SYSTEM AND METHOD OF RULE CREATION BASED ON FREQUENCY OF QUESTION

PRIORITY

This application claims the benefit of U.S. Provisional Application Ser. No. 61/999,735 filed Aug. 5, 2014, the disclosure of which is incorporated herein by reference in its entirety.

FIELD OF INVENTION

The invention in general relates to customer care systems for electronic devices and in particular relates to electronic communication devices for example Smartphones, tablets, TVs, entertainment systems, vehicles, navigation systems etc.

BACKGROUND OF THE INVENTION

Prior art customer care and tech support tools are inefficient for subscribers and costly for operators. When customers encounter a problem with their mobile device they have to endure lengthy phone calls, navigating decision trees, and website or forum searches that deliver static un-personalized content with little hope for finding an accurate resolution to their problem. Consumers today are busier and less patient than ever—they need quick, accurate, and personalized answers to their questions and do not want to navigate through menus and FAQs to find answers to their questions anymore.

Although prior art self-care systems enable customers to check their balances, view financial transactions and invoices, modify personal details, change billing cycle dates, modify payment methods, change service parameters, and most importantly troubleshoot some of the basic issues that they may encounter; they still have room for improvement.

As markets become saturated companies are in a fierce battle with their rivals to create levels of differentiation beyond price. Thus improved customer care that focuses on call volume reduction or call avoidance helps towards lowering the cost of customer support. Additionally fast resolution to customer problems/complaints results in more satisfied customers that increases customer retention.

Mean Time-to-Resolution (MTTR) helps organizations track the average amount of time spent resolving customer issues. Mean Time to Resolve (MTTR) is a service level metric that measures the average elapsed time from when an incident is reported until the incident is resolved. MTTR is typically measured in hours or days depending on the nature of the product or system being supported.

Typically Mean Time-to-Resolution (MTTR) tends to be in the domain of technical support, where organizations and their customers share the common goal of resolving customer issues as quickly as possible. For customers, this means returning to "operational status" as quickly as possible; for service providers this means keeping support costs low while maintaining a high level of customer satisfaction.

Many factors can contribute to MTTR. These factors include the communication skills and technical expertise of the representative and the customer, the representative's access to relevant resources, and their troubleshooting skills. It is well known that the majority of time is taken in identifying the root cause of the problem and the minority in actually fixing it. Thus quickly identifying where in the delivery chain or which components are causing or being affected by the problem can lead to a significant reduction in the problem identification phase and hence MTTR.

In general problems that are left to escalate tend to have a much higher cost to the organisation. Reducing the MTTR is a key objective of many operations groups with the desirable outcome of improved stakeholder satisfaction.

The current method of gathering and obtaining device information required for diagnostics is manual and therefore complex, time-consuming and prone to human errors. In the course of a customer care session for a device, a CSR (Customer Service Representative) must undertake the extensive and time-consuming task of asking the user complex questions pertaining to their wireless devices for problem diagnosis. This requires CSRs to be experts on many types of devices and their applications, and also requires users to spend increased time on the telephone to receive support for their applications. The result is increased support costs, increased call handling times, complex diagnostic processes and overall frustration.

Such prior methods lack automation and the user (or the CSR) is required to sift through massive amounts of data manually to get to the relevant information.

SUMMARY OF THE INVENTION

Broadly speaking, the system and the method provide a codified knowledgebase where rules are used to diagnose a problem and/or fine-tune the performance of various types of devices.

In one embodiment the system and method has the logic to apply rules to identify inaccuracies and inconsistencies in a device. These rules may be used to respond to a customer problem e.g. provide suitable answers to questions being asked by the customers or to fix a problem that has been encountered on the device or may be used to fine-tune the performance of the device so that it better utilizes the computing resources and services that it consumes.

In one embodiment a customer may ask a question by making a phone call to the customer care department of a company, or contact via e-mail or live chat session, or a web interface or forum to submit a question.

In one embodiment preferably the app has the capability to connect to the internet and also provides a user an interface using which the user may be able to enter a question. A question may be entered by inputting text in a graphical user interface or a user may be able to use a voice driven technology.

In one embodiment a set of rules is matched to the customer device profile. Thus depending on the customer device, a set of rules is selected preferably using the information that may have been gathered from the device e.g. the device make, model, OS and firmware versions, preferred language of the user, user country, service provider, time zone, user preferences, user profiles etc. This can be matched to a source or multiple sources that fit all of these criteria.

The matched set of rules is analyzed for the question being asked by the customer. This may use tags/natural language processing. Among the set of rules, there may be one that has a solution for the user's question when the question is run in a Rules Engine. This rule may be said to "fire". If no rules fire and no remedy is available, create a list, the question is added to a list of unfired questions.

A snapshot may be taken of the list of questions that did not fire a rule. By taking a snapshot the system is able to work on the list of questions without impacting the actual list that accumulates questions that did not fire any rules. The snapshot list of questions may be analyzed and the questions put into categories and sub-categories.

The frequency of a question being asked in a category may be determined by counting the number of times the same or similar question has been asked by different customers. In one embodiment this may also include prioritization by the mean time to resolve for each question.

For each unfired question handled in turn, there will be a list of candidate rules. In one embodiment an online server(s) store the list of candidate rules (or these may be stored in a centralized rules repository, or may even be stored on the user's device). In one embodiment there may preferably be a rules authoring interface using which rules can be created and edited. In one embodiment create a new rule or update an existing rule so that the initial question asked by a customer can be solved automatically next time another customer encounters the same issue. In one embodiment updating or editing a rule may include but is not limited to refining the rule conditions, changing the values in a rule e.g. changing the thresholds, changing or editing tags, adding new conditions, values, tags, etc. Candidate rules may, for example, address similar problems on another model of the same make of device, or may be at a draft (or proto-rule) stage from prior experience.

Devices that can benefit from the system may include but are not limited to a computer, a server, network appliance, set-top box, SmartTV, embedded device, computer expansion module, personal computer, laptop, tablet computer, personal data assistant, game device, e-reader, a mobile device for example a Smartphone, any appliances having internet or wireless connectivity and onboard automotive devices such as navigational and entertainment systems.

According to a first aspect of the invention, a method is provided for prioritizing rule creation for computer-assisted customer care to a user of a device. On receipt by a customer care analytics engine of a question from the user, together with a device profile of the device, and the question being one for which no rule is automatically fired, the question is added to an unfired questions list. The customer care analytics engine parses the question to match terms in other questions in the list. The question is added to an appropriate category in the list based on the device profile. A prioritization algorithm is applied to rank the question among other questions within the list or the category. The algorithm ranks the question more highly according to the frequency of those terms in the category or the list. According to its rank-wise order, the question is directed to a rule creation engine for creation of a rule to permit automatic handling of questions having the same or similar terms in the future.

Creation of a rule may include either rule creation or modification. Fields may also be automatically pre-populated from the device profile.

The prioritization algorithm may be applied to a snapshot of questions. For example, snapshots may be taken periodically, based on an event, or based on a threshold.

Preferably, the parsing uses a method to standardize and normalize terms. (Parsing is used here generically to refer to any machine-based method.) For example, these might include natural language processing and/or latent semantic analysis. The parsing method may particularly identify terms related to negative events and/or terms related to device functions.

The frequency of terms may be evaluated using a document term matrix.

In some embodiments, questions whose terms are below a frequency threshold may be ignored (that is, the questions may be left for customized solutions or CSR intervention when such situations arise).

The unfired question may be referred to a customer support representative (CSR) for resolution. In this case, the time to resolution for the question may be calculated. The prioritization algorithm may include comparing the time to resolution of the question to a mean time to resolution (MTTR) of other questions in the list. The ranking in the prioritization algorithm may include weighting the questions by MTTR.

The question may be submitted, for example, by text or voice.

Any changes to the device profile in the course of the CSR resolution may be tracked. Any discussion or text exchanges between the CSR and the user during the course of the resolution may also be tracked.

Such discussion or text exchanges may also be parsed using a method to standardize and normalize terms, and such terms from the discussion or text exchanges may be used in the creation of the rule.

BRIEF DESCRIPTION OF THE FIGURES

FIG. 7 includes sample questions and sample related document-term matrices.

DETAILED DESCRIPTION

Figure 1:
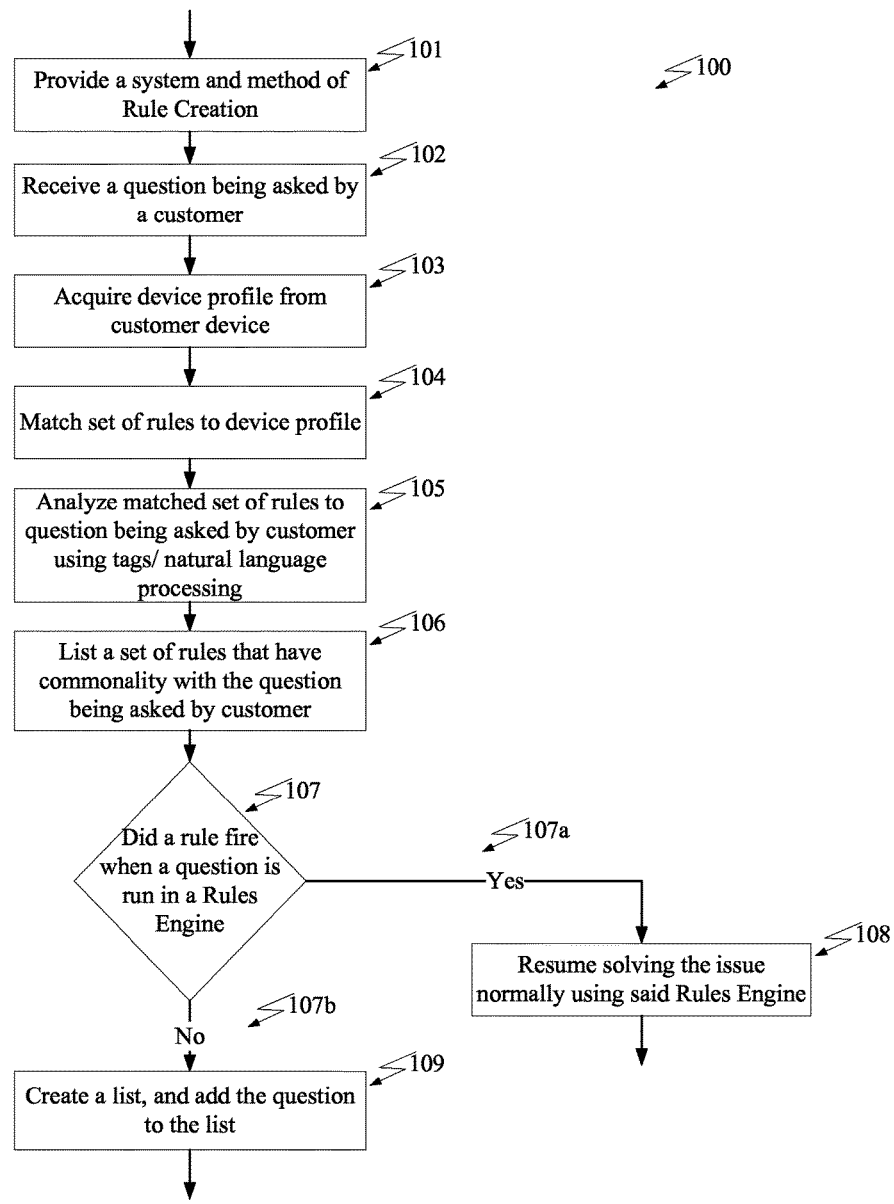
FIG. 1 is a flow diagram illustrating a basic process for handling an incoming question.

Before embodiments are explained in detail, it is to be understood that the invention is not limited in its application to the details of the examples set forth in the following descriptions or illustrated drawings. It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of the various embodiments described herein. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in details, it should be noted that the invention is not limited to any particular software language described or implied in the figures and that a variety of alternative software languages may be used for implementation.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages.

The embodiments of the systems and methods described herein may be implemented in hardware or software, or a combination of both. However, preferably, these embodiments are implemented in computer programs executing on programmable computers each comprising at least one processor, a data storage system (including volatile and nonvolatile memory and/or storage elements), and at least one communication interface. A computing device may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad, iPhone etc.). An application or an app other simulation may be stored on a storage media such as a DVD, a CD, flash memory, USB memory or other type of memory media or it may be downloaded from the internet. The storage media can be coupled with the computing device where it is read and program instructions stored on the storage media are executed and a user interface is presented to a user. For example and without limitation, the programmable computers may be a server, network appliance, set-top box, SmartTV, embedded device, computer expansion module, personal computer, laptop, tablet computer, personal data assistant, game device, e-reader, or mobile device for example a Smartphone. Other devices include appliances having internet or wireless connectivity and onboard automotive devices such as navigational and entertainment systems.

The program code may execute entirely on a mobile device or partly on the mobile device as a stand-alone software package; partly on the mobile device and partly on a remote computer or entirely on the remote computer or server. In the latter scenario, the remote computer may be connected to the mobile device through any type of network, including a local area network (LAN) or a wide area network (WAN), or the connection may be made to the internet through a mobile operator network (e.g. a cellular network). The code is specialized to execute functions described herein which enable a smoother and more efficient technological process.

The system has been developed because the sheer volume of inquiries with respect to modern devices outstrips all human ability to address each one. Even with automated rule-creation, as described in U.S. Ser. No. 13/968,631 (Device Profile Based Rule Making for Customer Care), the disclosure of which is incorporated herein by reference, the volume of related questions means that rule-creation for each individual query can quickly become impractical and duplicative. Further, a method of prioritizing is needed for making rules to address the most frequent questions that arise, and those that would otherwise take above average time to resolve.

Turning to FIG. 1, a system and method of rule creation is provided 101. This may be advantageously implemented for customer care solutions.

The system and method uses logic to apply rules to identify inaccuracies and inconsistencies in a device. These rules may be used to respond to a customer problem e.g. provide suitable answers to questions being asked by the customers or to fix a problem that has been encountered on the device or to fine-tune the performance of the device so that it better utilizes the computing resources and services that it consumes.

A rules engine can make it easy to express solutions to difficult problems and consequently have those solutions verified as rules which are much easier to read than code. Rule systems are capable of solving complex problems, providing an explanation of how the solution was arrived at and why each decision along the way was made.

A rules engine provides an efficient way of matching rule patterns to the domain knowledge. By using rules a repository of knowledge (a knowledgebase) is created which is automatically machine-executable; meaning that it's the single point of truth when verification for some items may be required.

A rule consists of some number of conditions and some number of actions. Generally the rules are written in a high-level business language that relates to the domain, storing the rules in the repository. The Rules Repository may also include proto-rules i.e. rules not completely validated yet for implementation. A database may be used as the preferred and exemplary embodiment to store the rules. In another embodiment the rules may be stored in a list, in a table or other storage method that may be suitable.

A rule can generally be represented as IF CONDITION(S) THEN RECOMMENDATION(S)/FIX(ES). It can consist of one or more conditions (the "IF"). One or more conditions can be grouped together by "and" and "or" and the order of operations can be further defined using brackets. In each condition, there could be a device attribute, a conditional operator (=, >, <, !=, exists, not exists) and then a text box in which to enter static text, numeric, date-time value or another device attribute. These conditions can then be rearranged, grouped, and joined together to form a bigger condition.

A rule should also contain a recommendation or a fix (the "THEN"). When saved, the rules will follow the Rules Lifecycle (status including but not limited to DRAFT, PENDING, VALIDATION, REJECTED, VALIDATED (Nth), ACTIVE, INACTIVE) and only active rules may be disseminated to other sources. The scope of a rule can be system-wide, device-specific, model-specific, manufacturer-specific, operator-specific, build-specific, condition-specific, setting-specific etc.

Each rule may embody the actual, required values for the different fields e.g. SMTP Server, Gateway IP addresses, APN, Build Versions, User name, Passwords, list of malicious apps, etc. The actual values may be seeded in a rule or could be obtained from another source either on the server or on the device. The execution of the rules may allow for the comparison of the values found on the device with the values in the rules. If the values are the same, i.e. the value of a field in the device and the value of the field in the rule are equal it may be concluded that the rule has passed and that no fix may be required. If the two values i.e. the value of a field in the device and the value of the field in the rule are NOT equal it may be concluded that the device is in need of a fix and the value of the field in the device may be replaced with the value of field in the rule.

A question is received from a customer 102. In one embodiment a customer may ask a question by making a phone call to the customer care department of a company, or contact via e-mail or live chat session, or a web interface or forum to submit a question. In another embodiment the question may be escalated from a user contact, or from one CSR group to another.

A self-care app may be provided that may preferably be installed by a customer on a mobile device. The app interface may preferably provide an interface for asking questions regarding any issues the customer may encounter regarding the mobile device where the app is installed. A question may be entered by inputting text in a graphical user interface or a user may be able to use a voice driven technology. The app may also preferably gather the device profile from the mobile device and submit that along with the question or problem being encountered by a customer. For example, using the app a customer asks the question "MMS not working on my mobile device". One method of gathering device profiles is to have an app installed on the device that queries the device for its settings and then sends these settings to the server. One such app is described and taught in U.S. patent application Ser. No. 13/968,631, filed Aug. 16, 2013, which is incorporated herein by reference. Another related system using a device-based approach is described and taught in U.S. patent application Ser. No. 14/256,640, filed Apr. 18, 2014, which is incorporated herein by reference.

In another embodiment the question may be escalated by a customer either directly from the app or by a CSR using another interface e.g. an intranet.

A device profile is acquired by the system from the customer device 103. Preferably the app may have an agent that has the capability to connect to the internet and also provides a user an interface using which the user may be able to enter a question. A question may be entered by inputting text in a graphical user interface or a user may be able to use a voice driven technology. There may be other methods for entering a question.

Information that can be gathered from the device may include but is not limited to: the device make, model and manufacture information, OS and firmware versions; applications (commonly referred to as "apps") installed on the device; apps and processes running on the device; certificates on the device; user profile information; the character of any passcode used to authenticate a user (e.g. whether a password/passcode is used and the relative strength of that password, such as the number of characters); information regarding whether the device operating system has been tampered with by the user (e.g. an iOS device has been jailbroken, or a Google Android device has been rooted); and the data usage e.g. the amount of MB or GB used for a given billing period, the amount data used while roaming, or the relative amount compared to a data plan used by the user.

For the above question "MMS not working on my mobile device" the device profile for example may provide device make, device model, OS version, language, operator, location, etc.:

Device Make=Samsung
Device Model=Galaxy S4
Operating System=Android 4.2.2
Language=English
Operator=Sprint
Location=New York, N.Y. USA
MMSC=http://mms.sprintpcs.com/servlets/mms The system and method may also extract and add to the device profile by adding data from the error logs for example types of errors, number of errors in an error log, severity of errors, number and frequency of crashes of the device etc.

There may be other sets of information that may be extracted from the device that are not listed above. The intent is to cover all such possible combinations and permutations that may be useful in assisting with analyzing the state of the device.

A set of rules is matched to the customer device profile 104. Thus depending on the customer device the set of rules is matched to the customer device profile preferably using the information that may have been gathered from the device e.g. the device make, model, OS and firmware versions, preferred language of the user, user country, service provider, time zone, user preferences, user profiles. There may be one source or multiple sources that fit all of this criteria.

The matched set of rules is analyzed by applying tags/natural language processing to the question being asked 105.

A set of rules is developed that have commonality with the question being asked by customer 106.

At this point, a rule may or may not fire when the question is run in a Rules Engine 107. A rules engine is a software system that executes one or more rules in a runtime environment. A rules engine may be viewed as a sophisticated if/then statement interpreter. The if/then statements that are interpreted are called rules. In one embodiment the app may have the agent and the rules engine embedded in it while also providing a user interface using which a user may be able to add text e.g. ask a question. In another embodiment the rules engine and the rules may be on a remote server. Thus if there are no rules in the rules repository that match the problem being encountered by a customer (or provide a solution), no rules will fire. Therefore new rules need to be added to the system continuously as new devices are launched and new problems are encountered. Some exemplary rules engines are described in U.S. Ser. Nos. 13/968,631 and 14/256,640, both incorporated herein by reference.

If Yes 107a, a rule fired when a question was run in a Rules Engine, then the system resumes solving the issue normally using the Rules Engine 108. In one embodiment a rule may embody a condition and may use some of the information that has been used to personalize the rule as well as the information gathered from the device. The rules may also preferably use reference values, standard values, target values, a range of values etc. to compare and replace values of a field on the device.

In one embodiment the value of a field from a rule may be replaced with the value of a field in the device. Alternatively a solution may be provided where the user may be able to edit, add, delete, modify etc. the values required in a field. In another embodiment information may be presented e.g. a notification or a tutorial or a roaming FAQ; alternatively a remedy may be suggested to the user as a course of action. In another embodiment the performance of the device may be fine-tuned for better utilization of existing computing power and services being consumed.

It is to be understood that the rules engine is not necessarily linear when executing the rules. There may be a common starting point when executing the rules, but as the rules get executed and as information gathered from the device is analyzed, one rule may trigger another rule that may be part of another set of rules. There may also be loops, so that there are rules embedded within rules, or a rule many call another rule as part of its execution. The rule that is called from within the loop or the rule that is called as part of the execution of another rule may not be fixed or static but may depend on the situation and vary as needed.

If No 107b, a rule did not fire when a question was run in the Rules Engine then the system creates a list, and adds the question to the list 109.

Figure 2:
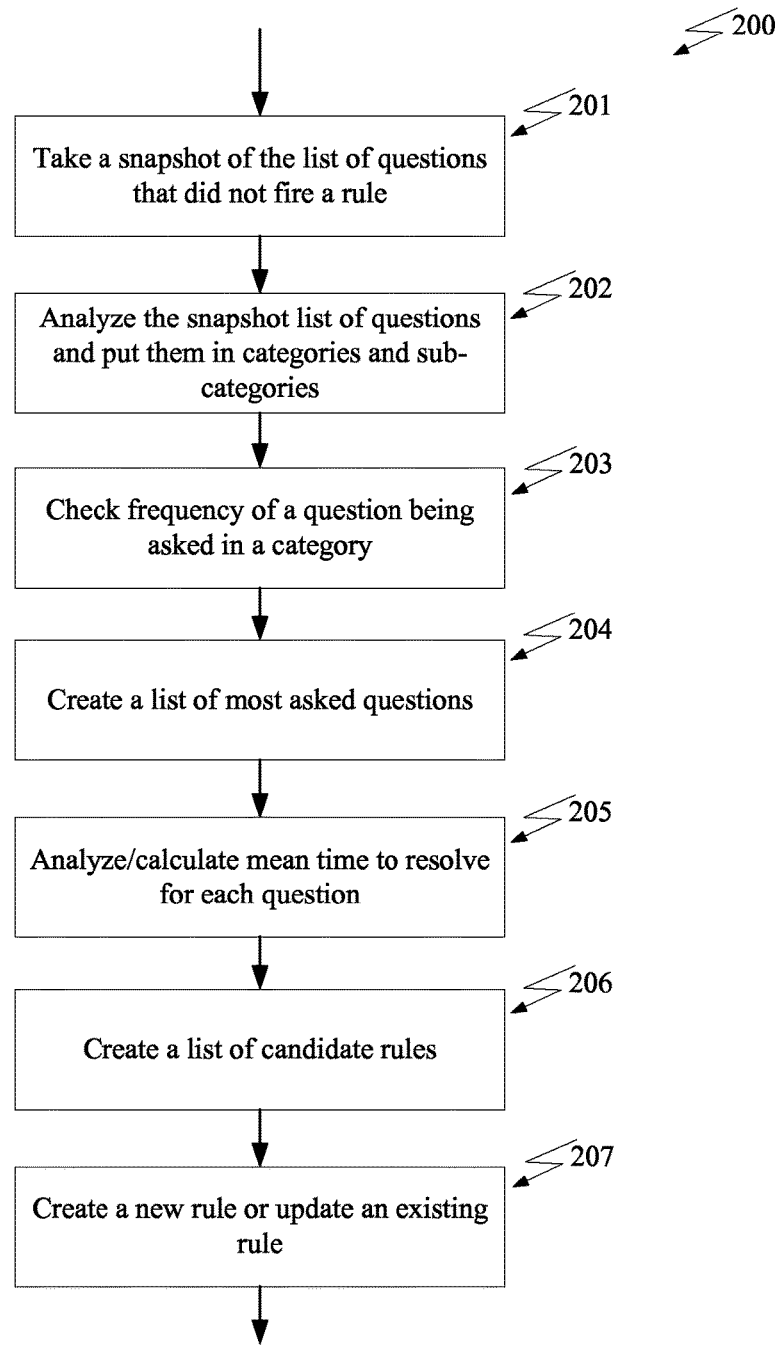
FIG. 2 is a flow diagram illustrating processing of a snapshot of unfired questions.

FIG. 2 shows one embodiment 200. A snapshot is taken of the list of questions that did not fire a rule 201. By taking a snapshot, the system is able to work on the list of questions without impacting the actual list that accumulates questions that did not fire any rules.

The snapshot list of questions is analyzed to put them into categories and sub-categories 202. In one embodiment the main categories may be based on the device manufacturers e.g. all questions related to iPhones are grouped together while all questions related to Samsung devices are grouped together; while the sub-categories may be based on the device models e.g. in the category that related to iPhones there may be sub-categories for iPhone4, iPhone5 etc; while in the category that related to Samsung there may be sub-categories for Galaxy4s, Galaxy5s etc. There may be other methods of categorizing for example using the type of problem to group the questions e.g. all coverage related problems form one category irrespective of the device make, model or year.

The system checks the frequency of a question being asked in a category 203. In one embodiment this may be done by counting the number of times the same or similar question has been asked by different customers. One approach is to use a document-term matrix or term-document matrix to calculate the frequency of terms in questions. Thus questions which share the same set of terms can be grouped together and counted to check their frequency. Document-term matrix is a mathematical matrix that describes the frequency of terms that occur in a collection of documents. In a document-term matrix, rows correspond to documents in the collection and columns correspond to terms. There are various schemes for determining the value that each entry in the matrix should take. One example is shown in FIG. 7 and described in further detail below.

Latent Semantic Analysis (LSA) may also be used prior to document-term matrix in order to group the questions that are related to each other. Latent Semantic Analysis is a technique in natural language processing for analyzing relationships between a set of documents and the terms they contain by producing a set of concepts related to the documents and terms. One example is described in further detail below (with respect to FIG. 7).

A list of most asked questions is created 204. In one embodiment by counting the number of times a question or similar question is being asked by different customers and then ordering this list in a descending order will put the most frequently asked questions at the top of the list.

The system analyzes/calculates the mean time to resolve for each question 205.

Mean Time-to-Resolution (MTTR) helps organizations track the average amount of time spent resolving customer issues. Mean Time to Resolve (MTTR) is a service level metric that measures the average elapsed time from when an incident is reported until the incident is resolved. MTTR is typically measured in hours or days depending on the nature of the product or system being supported.

A list of candidate rules is created 206. In one embodiment there is a direct relationship between the questions being asked by user/customers and the list of candidate rules.

Online server(s) may store the list of candidate rules. In one embodiment there may preferably be a rules authoring interface using which rules can be created and edited.

A new rule may be created or an existing rule may be updated 207. This is done so that the initial question asked by a customer can be solved automatically next time another customer encounters the same issue.

In one embodiment updating or editing a rule may include but is not limited to refining the rule conditions, changing the values in a rule e.g. changing the thresholds, changing or editing tags, adding new conditions, values, tags, etc.

Figure 3:
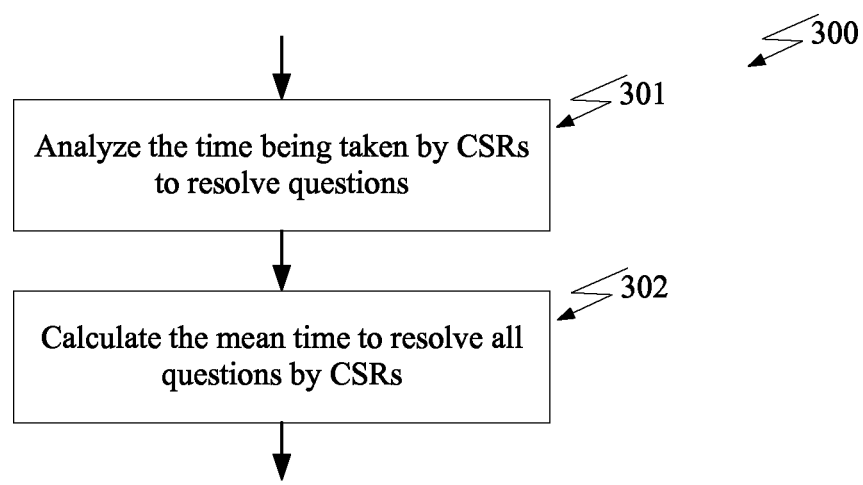
FIG. 3 is a flow diagram illustrating calculation of MTTR.

FIG. 3 shows one embodiment 300. The time being taken by CSRs to resolve questions may be analyzed 301. In one embodiment analyze the time being taken by CSRs to resolve questions. For example, each customer encounter/complaint may be assigned a Case-ID to identify it uniquely and be tracked in terms of when the customer started the encounter and when the case was resolved for the customer. Additionally call centers may measure the length of each call when customers call with a complaint.

The mean time to resolve all questions by CSRs may be calculated 302. The MTTR (Mean Time-to-Resolution) for all questions is the mean of the MTTR for each question.

Figure 4:
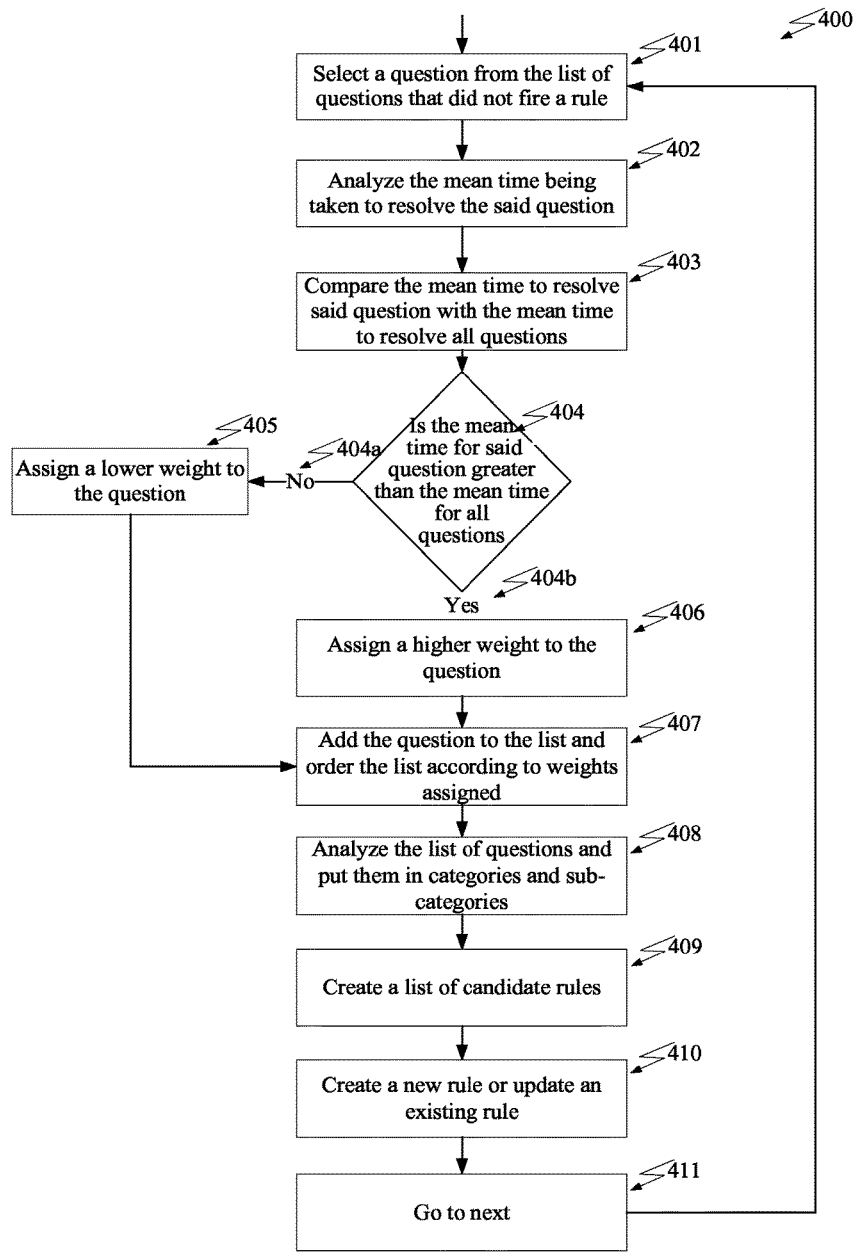
FIG. 4 is a flow diagram illustrating more detailed prioritization process for handling unfired questions with weighting by MTTR.

FIG. 4 shows one embodiment 400. A question is selected from the list of questions that did not fire a rule 401.

The mean time being taken to resolve the question is analyzed 402. MTTR (Mean Time-to-Resolution) may be measured in minutes or hours.

The mean time to resolve the question can be compared with the mean time to resolve all questions 403.

In another embodiment the mean time to resolve a question may be compared to another metric or threshold for example a defined time thus an organization may decide that any question that takes longer than 20 minutes to resolve should be added to the list. Preferably this metric or threshold may be configurable and an organization may opt to modify it as needed or based on other factors.

The system can then evaluate whether the mean time for the question is greater than the mean time for all questions 404.

If No 404a, the mean time to resolve the question is lower than the mean time to resolve all questions, then a lower weight may be assigned to the question 405. The question may be added to the list and the list ordered according to weights assigned 407.

If Yes 404b, the mean time to resolve the question is greater than the mean time to resolve all questions then a higher weight may be assigned to the question 406.

The question may be added to the list and the list ordered according to weights assigned 407.

The list of questions is analyzed and put into categories and sub-categories 408. In one embodiment only select questions that have been assigned higher weights may be assigned to categories and sub-categories.

A list of candidate rules is created 409.

A new rule may be created or an existing rule may be updated 410. This is done to codify the knowledge so that next time a customer encounters the same issue it can be resolved by using the newly created rule and a Rules Engine.

In one embodiment, a solution may be provided where a person may be able to edit, add, delete, modify etc. the conditions for rule creation. In another embodiment information may be presented as drop down menus from where a rule creator can pick the conditions, possible values and tags that make up the rule. In one embodiment the newly created rule or rules that have been updated may be stored in a rules repository.

In step 411, the method proceeds to the list of questions that did not fire a rule and selects the next question to continue the process.

Figure 5:
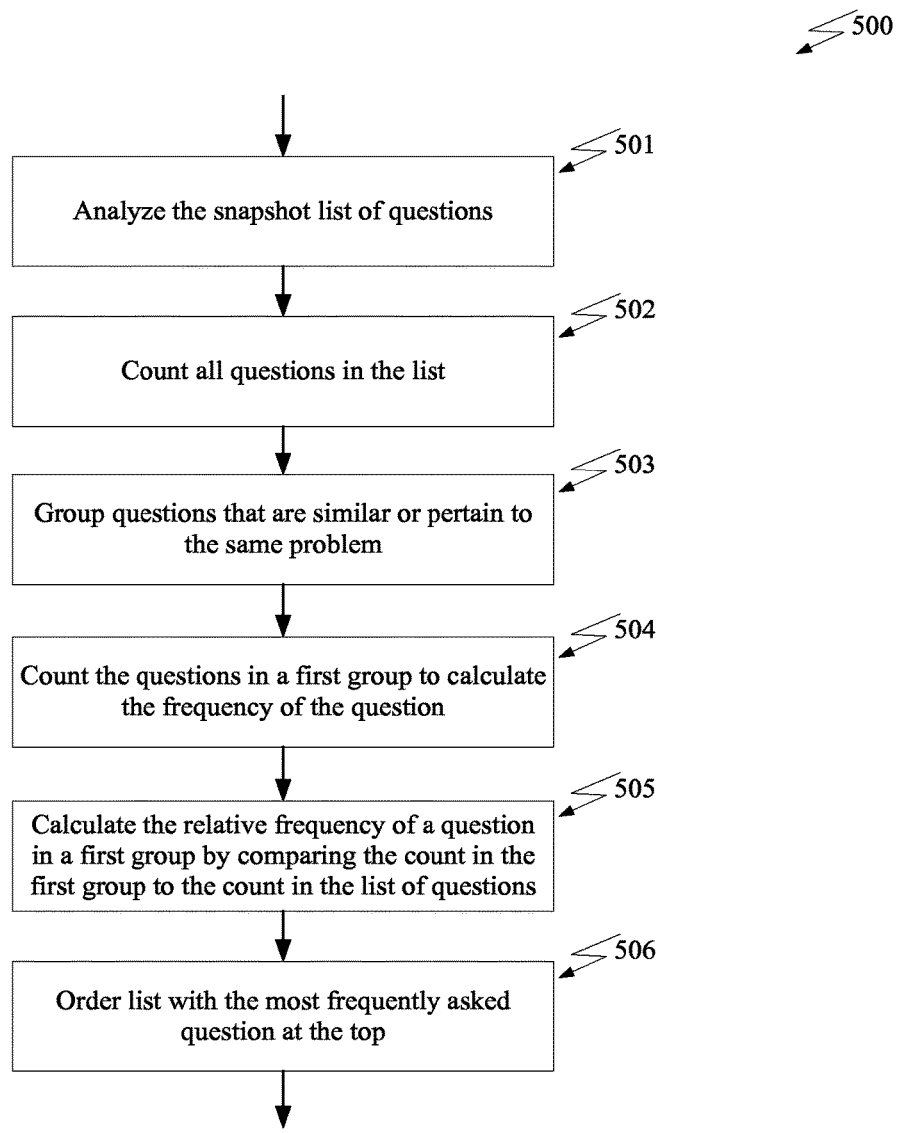
FIG. 5 is a flow diagram illustrating a process for ranking of questions to prioritize rule creation.

FIG. 5 shows one embodiment 500. The snapshot list of questions is analyzed 501.

All questions in the list may be counted 502.

Questions that are similar or pertain to the same problem may be grouped together 503. For example, questions may be grouped that pertain to the same manufacture, make and model of device.

The questions in a first group may be counted to calculate the frequency of the question 504. In one embodiment count the questions in a first group to calculate the frequency of the question. By "frequency of the question", we refer to the term and situational similarity between a given question and others posed by other users (and how many similar questions are in this group or cluster).

The relative frequency of a question in a first group is calculated by comparing the count in the first group to the count in the list of questions 505. Similarly the relative frequency of a question may be calculated in a second group by comparing the count in the second group to the count in the list of all questions.

The list may be ordered with the most frequently asked question (i.e. issue faced by most users) at the top 506. In one embodiment the questions may be placed in a descending order in terms of their frequency and the questions at the top of the list can be considered to be the most frequently asked question(s).

These steps may be repeated as often as necessary to keep the list of most frequently asked questions up to date. Thus for example in one embodiment these steps may be repeated every few minutes, or once an hour or once a day while in another embodiment they may be repeated once a week, while in another embodiment they may be repeated once a month or every time there is a defined event e.g. when a device is launched. In an alternate embodiment the list of most frequently asked questions may be customizable while in another embodiment it may be based on other events.

Figure 6:
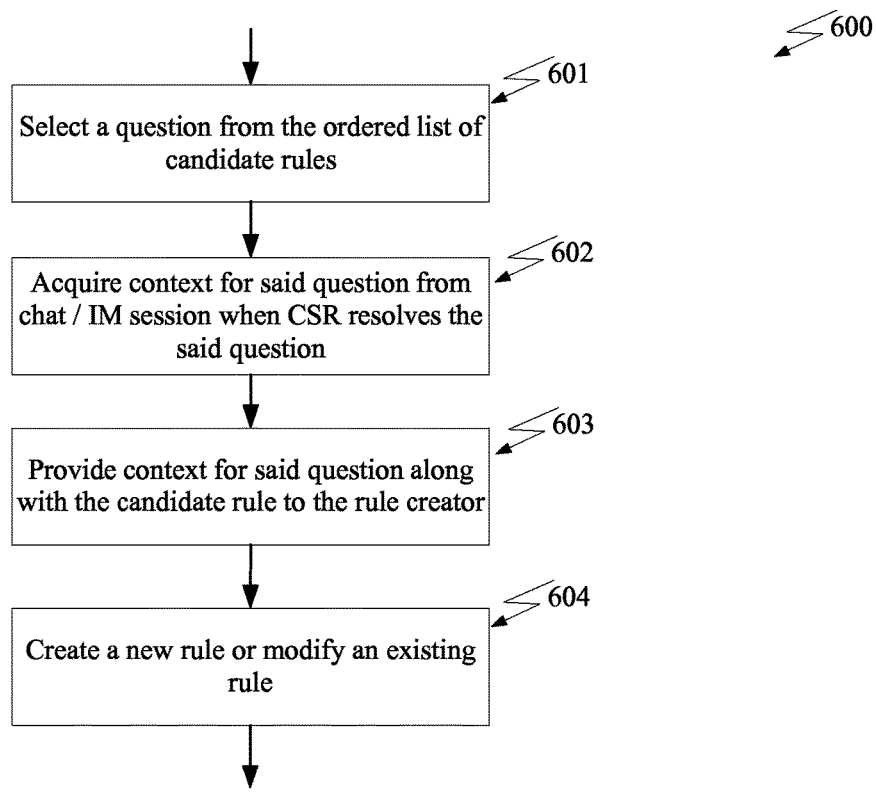
FIG. 6 is a flow diagram illustrating use of context for rule creation.

FIG. 6 shows one embodiment 600. A question may be selected from the ordered list of candidate rules 601.

Context for the question may be acquired from chat/IM session when CSR resolves the question 602. Context may include the entire IM session between the CSR and the customer, the e-mails exchanged, the recording of the phone call when the customer called with the problem and how the CSR resolved the issue using a method that has not been codified by a rule, device profile(s) etc. In one embodiment the context may be the notes from a CSR or other technical expert on how they resolved the problem. In one embodiment preferably the context may be a combination of all or some of aforementioned.

This context information may be passed along with the candidate rule to the rule creator 603. By providing the context for how the problem was solved by a given CSR, the knowledge can be codified in a new rule.

A new rule may be created or an existing rule may be modified 604. This is done so that the initial question asked by a customer can be solved automatically next time another customer encounters the same issue. In one embodiment updating or editing a rule may include but is not limited to refining the rule conditions, changing the values in a rule e.g. changing the thresholds, changing or editing tags, changing Natural Language Processing (NLP) tags, and/or adding new conditions, values, Natural Language Processing (NLP) tags, etc.

In one embodiment the system may provide a Rules Authoring user interface (UI) that may consist of an input page with drop-downs and text input boxes or it may be a UI that is based off the device profile view or comparison view where the rule author can pick and choose the conditions to build the CONDITIONS and the RECOMMENDATIONS/FIXES.

FIG. 7 illustrates one preferred method of determining frequency of terms (outlined in broad strokes in steps 501-506 of FIG. 5) using a cleaning/standardizing process followed by a document-term matrix analysis. To explain how this process might be implemented, take the following example.

An operating system update has been pushed by a Smartphone manufacturer to their phone users. Soon thereafter the users start to report various issues with their phones. Below is a description of how the system receives several questions from different users and uses these to prioritize rule creation.

Input: Sample User Questions/Queries:
Q1: My phone has allways worked suddenly my calls are being dropped????
Q2: I cant sync my personnal data since the 18est OS update
Q3: My downloads are randumly crashing. :-(
Q4: Wen Im listening to music my service suddenly stops, This has happend alot resently. etc.

Step One: Preprocessing Questions/Queries Using NLP Techniques

Natural Language Processing techniques may first be used in a preprocessing step to interpret the "noisy" import and filter out irrelevant sections of the queries. For example, the following may be considered noisy and may either be removed or corrected:
Removal of emoji and nonstandard punctuation
Normalizing spelling using lexical resources and probabilistic methods
Detecting boundaries of unpunctuated and punctuated sentences based on the syntactic structure, probabilistic models
Classification of extracted sentences using machine-learning models to determine which ones are the most relevant for customer care purposes Step One Output:
Q1: Suddenly my calls are being dropped.
Q2: I can't sync my personal data since the latest OS update Q3: My downloads are randomly crashing.
Q4: When I'm listening to some music my music service suddenly stops etc.

Step Two: Linguistic Analysis of User Queries Using NLP Techniques:

Next, the words and phrases cleaned from the previous step may be evaluated to elucidate their functions in the sentences. To do this, Natural Language Processing (NLP) techniques such as part-of-speech tagging, parsing, etc. may be used.

In one embodiment, the semantic roles of the expressions in the sentences may be determined through a semantic parser which labels the roles of the linguistic expressions in the output from Step One. These may be extracted by the system and normalized to lexemes:

Semantic Roles
Q1: action: drop, object: call, manner: suddenly
Q2: action: not sync, object: data, complement: update
Q3: action: crash, subject: download, manner: randomly
Q4: action: stop, subject: music service, manner: suddenly etc.

In another embodiment, the syntactic roles of the words in the output produced in Step One may be determined through a part-of-speech analysis and normalized using information retrieval stemming process:

Information Retrieval Approach
Q1: verb: drop, noun: call, adverb: suddenli
Q2: verb: sync, noun: data, update
Q3: verb: crash, noun: download, adverb: randomli
Q4: verb: stop, noun: music, service, adverb: suddenli etc.

These methods may be combined or used as alternatives, or another method may be used to enable the terms of the questions to be compared "like with like" for the purpose of determining the frequency.

Step Three: Aggregate and Calculate Frequencies of the Extracted Expressions

The resulting strings with actions and semantic roles may be stored continuously in an information retrieval system. These actions and roles may then be aggregated periodically using a lexical ontology. In this process actions that are typically used to describe faulty devices and the strings with semantic roles that refer to device functions are stored. The goal is to group the user queries describing events that are negatively affecting their devices (FNSE), the phone functions that are being affected (FNAPF) and the characterization of these negative events (FNSE.modifier('unexpected')).

Output Step Three: Semantic Approach

Frequency of Semantically Negative Events (FSNE formula)=drop+not sync+crash+stop+etc./Number of Queries in a time period  a)

Frequency of Negatively Affected Phone Functions (FNAPF formula):=calls+data+downloads+music service+etc./Number of Queries in a time period  b)

Frequency of Semantically Negative Events Modified by 'unexpected' type adverbs (FSNE.modified('unexpected'))

FSNE.modifier('unexpected')=suddenly+randomly+suddenly+etc./FSNE  c)

In another embodiment, a term-document matrix of the verb, noun and adverb expressions which are not stop words may be created, as illustrated in FIG. 7. (Stop words are typically the most common words, some of which will appear in virtually every query; words such as 'a', 'an', 'my', etc.).

Output Step Three: Information Retrieval Approach:

As can be seen in FIG. 7, the following matrices may be used:
Verb term-document matrix
Noun term-document matrix
Adverb term-document matrix The Term Frequency-Inverse Document Frequency (TF-IDF) may be calculated for each of the remaining terms using known methods and formulae. The goal in both approaches is to use the frequency values to isolate and quantify the issues that users are experiencing during a given time period.

In the first case the most frequently mentioned negative events can be identified. In the second case the most linguistically novel terms or the most widespread terms from an information retrieval perspective, can be determined based on the term Frequency-Inverse Document Frequency (TF-IDF) calculation. Those terms with higher TF-IDF values refer to the least frequently encountered issues, those with the lowest values refer to the more frequently encountered issues.

Step Four: Correlating Device Data and Linguistic Information

Using the semantic role frequencies or the TF-IDF values it is possible to correlate the linguistic information from the user queries with device information such as device make, model, operating system version, etc. In this case, given the frequency of negative events described in these questions ("crash", "drop", etc.), and the fact that all of the devices reporting these issues have a recent OS change, the questions can be prioritized as falling under single, frequently occurring, theme and may be lumped together for rule-making.

It is to be understood that these are exemplary methods and there may be other methods that are commonly used and obvious to the one skilled in the art. The intent is to cover all such methods that may be used to implement the method.

It should be understood that although the term application has been used as an example in this disclosure but in essence the term may also imply to any other piece of software code where the embodiments are incorporated. The software application can be implemented in a standalone configuration or in combination with other software programs and is not limited to any particular operating system or programming paradigm described here. Thus, this invention intends to cover all applications and user interactions described above as well as those obvious to the ones skilled in the art.

Several exemplary embodiments/implementations have been included in this disclosure. There may be other methods obvious to the ones skilled in the art, and the intent is to cover all such scenarios. The application is not limited to the cited examples, but the intent is to cover all such areas that may be benefit from this invention.

The examples noted here are for illustrative purposes only and may be extended to other implementation embodiments. While several embodiments are described, there is no intent to limit the disclosure to the embodiment(s) disclosed herein. On the contrary, the intent is to cover all practical alternatives, modifications, and equivalents.

What is claimed is:

1. A method of prioritizing rule creation for computer-assisted customer care to a user of a device, comprising:
on receipt by a customer care analytics engine of a question from the user, together with a device profile of the device, the question being one for which no rule was automatically fired by a rules engine, adding the question to an unfired questions list;

the customer care analytics engine parsing the question to match terms in other questions in the list;

adding the question to a category in the list based on the device profile;

applying a prioritization algorithm to rank the question among other questions within the list or the category, the algorithm ranking the question more highly according to the frequency of those terms in the category or the list; and according to its rank-wise order, directing the question to a rules engine for creation of a rule to permit automatic handling of questions having the same terms in the future, and ignoring questions whose terms are below a frequency threshold.

2. The method of claim 1, wherein the prioritization algorithm is applied to a snapshot of questions.

3. The method of claim 2, wherein the snapshot is periodic.

4. The method of claim 2, wherein the snapshot is based on an event.

5. The method of claim 2, wherein the snapshot is based on a threshold.

6. The method of claim 1, wherein the parsing includes natural language processing.

7. The method of claim 1, wherein the parsing includes latent semantic analysis.

8. The method of claim 1, wherein the parsing identifies terms related to negative events.

9. The method of claim 1, wherein the parsing identifies terms related to device functions.

10. The method of claim 1, wherein the frequency of terms is evaluated using a document term matrix to count how often each term occurs across questions in the category or the list.

11. The method of claim 1, further comprising referring the question to a customer support representative (CSR) for resolution.

12. The method of claim 11, wherein the time to resolution for the question is calculated.

13. The method of claim 12, wherein the prioritization algorithm includes comparing the time to resolution of the question to a mean time to resolution (MTTR) of other questions in the list.

14. The method of claim 13, wherein the ranking in the prioritization algorithm includes weighting the questions by MTTR.

15. The method of claim 1, wherein the question is submitted by text or voice.

16. The method of claim 11, wherein any changes to the device profile in the course of the CSR resolution are tracked.

17. The method of claim 11, wherein any discussion or text exchanges between the CSR and the user during the course of the resolution are tracked.

* * * * *